United States Patent [19]

Sano et al.

[11] Patent Number: 5,769,930
[45] Date of Patent: Jun. 23, 1998

[54] INK COMPOSITION FOR INK JET RECORDING AND RECORDING PROCESS USING SAME

[75] Inventors: Tsuyoshi Sano; Hiroko Hayashi, both of Nagano, Japan

[73] Assignee: Seiko Epson Corporation, Tokyo, Japan

[21] Appl. No.: 723,640

[22] Filed: Oct. 3, 1996

[30] Foreign Application Priority Data

Oct. 6, 1995 [JP] Japan ................................. 7-260586
Apr. 23, 1996 [JP] Japan ................................. 8-101753
Jul. 16, 1996 [JP] Japan ................................. 8-185733

[51] Int. Cl.$^6$ ........................................... C09D 11/02
[52] U.S. Cl. ............................ 106/31.36; 106/31.58; 106/31.59; 106/31.68; 106/31.86; 106/31.89
[58] Field of Search ................ 106/31.36, 31.68, 106/31.58, 31.86, 31.59, 31.89

[56] References Cited

U.S. PATENT DOCUMENTS 5,112,399  5/1992  Slevin et al. .
5,226,957  7/1993  Wickramanayake et al. .
5,376,169  12/1994  Hotomi et al. .......................... 106/23

FOREIGN PATENT DOCUMENTS

A20591004  4/1994  European Pat. Off. .
54-62005   5/1979  Japan ............................ C09D 11/00
62-121775  6/1987  Japan .
3-234773   10/1991 Japan .
5-194884   8/1993  Japan ............................ C09D 11/00
6-88048    3/1994  Japan ............................ C09D 11/00
7-003195   1/1995  Japan .

*Primary Examiner*—Deborah Jones
*Attorney, Agent, or Firm*—Sughrue, Mion, Zinn, Macpeak & Seas, PLLC

[57] ABSTRACT

An ink composition for ink jet recording, ink composition set, ink cartridge, ink jet recording apparatus and ink jet recording process is disclosed, which can give a highly colored and high quality recorded image without causing color bleeding and feathering with a high reliability in recovery from clogging in ink jet recording. The ink composition comprises (A) a colorant, (B) an alginate, (C) a liquid wetting agent, (D) a penetrant, and (E) water. As the foregoing liquid wetting agent component (C) there is contained glycerin in an amount of not less than 8% by weight based on the weight of the composition.

18 Claims, 1 Drawing Sheet

INK COMPOSITION FOR INK JET RECORDING AND RECORDING PROCESS USING SAME

FIELD OF THE INVENTION

The present invention relates to an ink composition for ink jet recording, an ink composition set, a cartridge, an ink jet recording apparatus, an ink jet recording process and an image formed by the ink jet recording process. In accordance with the present invention, high coloring properties and high image quality printing can be particularly attained on an ordinary paper. Further, color bleeding and feathering can be lessened or eliminated.

BACKGROUND OF THE INVENTION

As inks for ink jet recording there have been heretofore proposed inks having various compositions. The recent trend is that the quality of image printed on a so-called ordinary paper, including copying paper and regenerated paper, is regarded as important. The print. quality required for ordinary paper is that the printed matter must be highly colored. On the other hand, when a plurality of color recording inks come into contact with each other, no bleeding (color bleeding) must occur. In general, in order to enhance the coloring properties, it is preferred to inhibit the penetration of the ink. However, in order to lessen or eliminate color bleeding, it is preferred to enhance the penetrating capacity of the ink.

Various inks which can give solution to these problems have been proposed. For example, JP-A-5-194884 (The term "JP-A" as used herein means an "unexamined published Japanese patent application") claims that the incorporation of a high molecular colloid, at least one surface active agent having a concentration of not lower than critical micelle concentration, and a low vaporizing pressure solvent in an ink makes it possible to lessen bleeding on a recording paper.

On the other hand, JP-A-6-8048 claims that the use of a recording ink comprising a surface active agent incorporated therein in a concentration of not lower than critical micelle concentration with respect to ink and not higher than critical micelle concentration with respect to pure water can exert an effect of surface active agent of inhibiting bleeding of-ink on a recording medium and bleeding at color borders.

However, the foregoing prior art cannot thoroughly eliminate the foregoing conflicting problems. In some detail, the following problems have been left unsolved.

Firstly, recorded images thus obtained are lowly colored. In other words, for the purpose of eliminating color bleeding on recorded images, the surface tension of the conventional inks is remarkably lowered to enhance its penetrating capacity. Thus, the ink droplet shot onto the recording paper penetrates into micropores existing between fibers by the action of capillarity to get deep into the paper. This reduces the coloring properties of the recorded image. Further, the ink dot shot onto the recording medium lacks sharpness at the periphery thereof, giving a blurred recorded image. This impedes the enhancement of definition of the recorded image.

In general, when the ink penetrating capacity is reduced, the coloring properties of the recorded image can be enhanced. At the same time, the dot shot onto the paper can be made sharp. However, an ink having a reduced penetrating capacity has a reduced dryability on the recording medium. Therefore, if a plurality of inks are used as in color printing, inks which have been left undried on the recording medium are mixed with each other, causing color bleeding and hence deteriorating the image quality. Thus, the conventional inks have left something to be desired in print quality when recorded on an ordinary paper.

The second problem is clogging in the print head nozzle. The ink described in JP-A-5-194884 comprises a high molecular colloid. Thus, water is evaporated from the ink in the vicinity of the nozzle when no printing is effected over an extended period of time longer than several days. The concentration of the high molecular compound then rises to cause a sudden rise in the ink viscosity. Further, the high molecular compound is deposited. When printing is resumed under these conditions, the head nozzle is clogged, making it impossible to properly jet the ink. This results in a remarkable deterioration of print quality.

SUMMARY OF THE INVENTION

It is therefore an object of the present invention to provide an ink for ink jet recording and a recording process which can give a highly colored sharp and clear recorded image on an ordinary paper without causing clogging in the head nozzle while lessening or eliminating color bleeding upon color mixing on a recording medium.

The foregoing object of the present invention is accomplished by an ink composition for ink jet recording comprising (A) a colorant, (B) an alginate, (C) a liquid wetting agent, (D) a penetrant, and (E) water, wherein as said liquid wetting agent (C) there is contained glycerin in an amount of not less than 8% by weight based on the weight of the ink composition.

The foregoing object of the present invention is accomplished by a color ink jet recording process using one or more of the foregoing ink composition for ink jet recording.

DETAILED DESCRIPTION OF THE INVENTION

Figure 1:
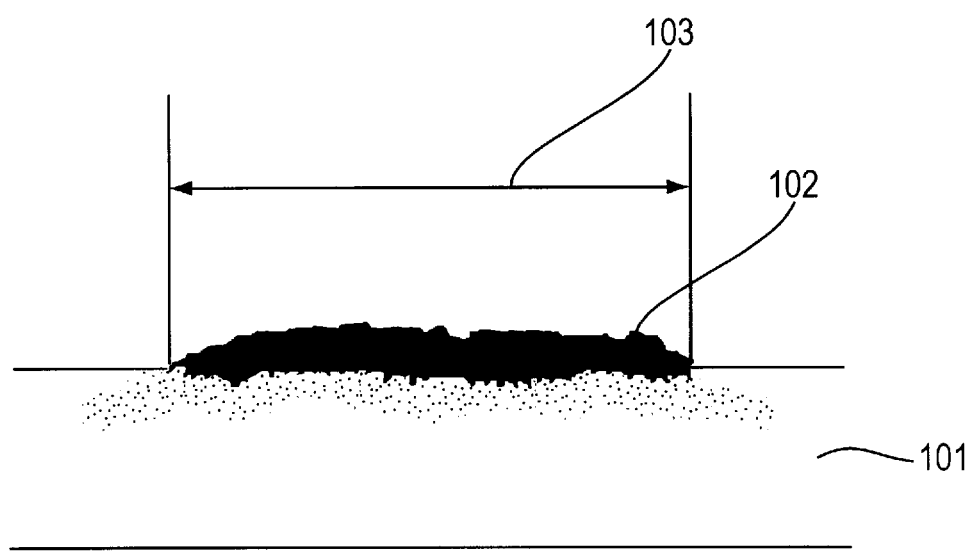
FIG. 1 is a diagram illustrating a process for the measurement of droplet diameter on a paper in a spreading test for determining the spreading of a surface diffusibility imparting agent employable in the present invention, wherein 101 represents a paper, 102 represents an ink droplet, and 103 represents a droplet diameter.

The colorant (A) to be used in the present invention is not specifically limited so far as it is a colorant which has been heretofore used in ink composition for ink jet recording. Examples of the colorant include acidic dye, food dye, basic dye, reactive dye, disperse dye, direct dye, vat dye, soluble vat dye, reactive disperse dye, and pigment colorant.

Specific examples of the direct dye include C.I. direct red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. direct violet 7, 9, 47, 48, 51, 66, 90, 93, 94, 95, 98, 100 and 101, C.I. direct yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163, C.I. direct blue 1, 10, 15, 22, 25, 55, 67, 68, 71, 76, 77, 78, 80, 84, 86, 87, 90, 98, 106, 108, 109, 20 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291, and C.I. direct black 9, 17, 19, 22, 32, 51, 56, 62, 69, 71, 80, 91, 94, 97, 108, 112, 113, 114, 117, 118, 121, 122, 12 132, 25 146, 154, 166, 168, 173 and 199.

Specific examples of the acidic dye include C.I. acid red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397, C.I. acid violet 5, 34, 43, 47, 48, 90, 103 and 126, C.I. acid yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227, C.I. acid blue 9, 25, 40, 41, 62, 72, 76, 78, 80, 82, 92, 106, 112, 113, 120, 127, 129, 138, 143, 175, 181, 205, 207, 220, 221, 230, 232, 247, 258, 260, 264, 271, 277, 278, 279, 280, 288, 290 and 326, and C.I. acid black 7, 24, 29, 48, 52:1 and 172.

Specific examples of the reactive dye include C.I. reactive red 3, 13, 17, 19, 21, 22, 23, 24, 29, 35, 37, 40, 41, 43, 45, 49 and 55, C.I. reactive violet 1, 3, 4, 5,. 6, 7 8, 9, 16, 17, 22, 23, 24, 26, 27, 33 and 34, C.I. reactive yellow 2, 3, 13, 14, 15, 17, 18, 23, 24, 25, 26, 27, 29, 35, 37, 41 and 42, C.I. reactive blue 2, 3, 5, 8, 10, 13, 14, 15 17, 18, 19, 21, 25, 26, 27, 28, 29 and 38, and C.I. reactive black 4, 5, 8, 14, 21, 23, 26, 31, 32 and 34.

Specific examples of the basic dye include C.I. basic red 12, 13, 14, 15, 18, 22, 23, 24, 25, 27, 29, 35, 36, 38, 39, 45 and 46, C.I. basic violet 1, 2, 3, 7, 10, 15, 16, 20, 21, 25, 27, 28, 35, 37, 39, 40 and 48, C.I. basic yellow 1, 2, 4, 11, 13, 14, 15, 19, 21, 23, 24, 25, 28, 29, 32, 36, 39 and 40, C.I. basic blue 1, 3, 5, 7, 9, 22, 26, 41, 45, 46, 47, 54, 57, 60, 62, 65, 66, 69 and 71, and C.I. basic black 8.

In the ink composition of the present invention, the colorant (A) may be composed of one or more of the foregoing dyes and/or pigments. The content of the colorant (A) depends on the kind of the colorant, solvent and dispersant component and/or requirements and is not specifically limited but is preferably from 0.2 to 10% by weight, more preferably from 0.5 to 7% by weight based on the total weight of the ink composition. If the content of the colorant falls below 0.2% by weight, the coloring on the printed matter can be light. On the contrary, if the content of the colorant exceeds 10% by weight, malinjection from the printer head can occur. The content of the colorant is more preferably not less than 0.5% by weight from the standpoint of coloring properties and not more than 7% by weight from the standpoint of injection properties.

As the foregoing colorant (A) there may be used a dye containing a carboxylic acid or carboxylate group (hereinafter referred to as "carboxyl group-containing dye") to further enhance the water resistance of image, making it possible to lessen or eliminate color bleeding more effectively.

The number of carboxylic acid or carboxylate groups to be contained in the foregoing carboxyl group-containing dye is not specifically limited but preferably is from 1 to 10, more preferably from 1 to 5. The foregoing carboxylic acid or carboxylate group may be in the form of free carboxylic acid but preferably is in the form of salt. Examples of the salt include alkaline metal salt (e.g., sodium salt, potassium salt), ammonium salt, and substituted ammonium salt. Examples of the substituted ammonium salt include quaternary ammonium salt substituted by a single $C_{1-4}$ lower alkyl group (particularly methyl group or ethyl group), quaternary ammonium salt substituted by two same or different $C_{1-4}$ lower alkyl groups, and quaternary ammonium salt substituted by three same or different $C_{1-4}$ lower alkyl groups. Particularly preferred among these substituted ammonium salts is tri-substituted quaternary ammonium salt.

In the ink composition of the present invention, the foregoing colorant (A) may comprise a carboxyl group-containing dye, singly or in combination with a dye and/or pigment free of carboxylic acid or carboxylate group. Further, an ink composition (of a certain color) of the present invention comprising a carboxyl group-containing dye alone and an ink composition (of another color) of the present invention comprising a dye and/or pigment free of carboxylic acid or carboxylate group may be used in combination. Accordingly, the content of the carboxylic group-containing dye in the ink composition is preferably from 0.2 to 10% by weight, more preferably from 0.5 to 5% by weight based on the total weight of the ink composition.

The ink composition of the present invention comprises the foregoing alginate (B). It is known that an alginate can normally react with a polyvalent metal cation other than magnesium (e.g., calcium, aluminum) in its aqueous solution to undergo gelation to thicken the aqueous solution. According to the inventors' investigation, it was confirmed that an ordinary paper contains a polyvalent metal cation (e.g., calcium, aluminum) besides a monovalent cation (e.g., sodium). Accordingly, when an aqueous ink composition of the present invention is jetted onto an ordinary paper, a polyvalent metal cation is eluted from the paper with the ink composition to accelerate the gelation reaction of alginate. The ink composition undergoes rapid gelation to thicken. This inhibits the lateral development of the ink composition and the vertical penetration of the ink composition. Thus, bleeding on the ordinary paper can be inhibited or lessened to give sharp dots and provide high coloring properties. In other words, although a phenomenon such as lateral development or vertical penetration of the ink composition can be normally inhibited by the use of a penetrant, the ink composition of the present invention can do by the alginate incorporated therein, making it possible to enhance the print quality as mentioned above.

As the foregoing alginate (B) there may be used an alkaline metal salt (e.g., sodium salt, potassium salt), ammonium salt or substituted ammonium salt of alginic acid having a molecular weight of from 5,000 to 100,000. Examples of the substituted ammonium salt include quaternary ammonium salt substituted by a single $C_{1-4}$ lower alkyl group (particularly methyl group or ethyl group), quaternary ammonium salt substituted by two same or different $C_{1-4}$ lower alkyl groups, and quaternary ammonium salt substituted by three same or different $C_{1-4}$ lower alkyl groups. Particularly preferred among these substituted ammonium salts is tri-substituted quaternary ammonium salt. In some detail, an Aldorich's reagent, Duck Algin (trade name of alginate produced by Kibun Food Chemifa Co., Ltd.), etc. may be used. The content of the alginate (B) depends on the molecular weight of the alginate used and thus is not specifically limited but preferably is from 0.02 to 0.5% by weight, more preferably from 0.05 to 0.2% by weight based on the total weight of the ink composition. If the content of the alginate falls below 0.02% by weight, the degree of gelation can be lowered. On the contrary, if the content of the alginate exceeds 0.5% by weight, the ink composition can thicken to an extent such that it cannot be jetted. The content of the alginate is more preferably not less than 0.05% by weight to accelerate gelation and hence inhibit bleeding. Further, the content of the alginate is more preferably not more than 0.2% by weight from the standpoint of ink viscosity (i.e., jetting stability).

The inventors made further studies of the mechanism of gelation by the foregoing alginate (B). Focusing on the ratio of D-mannuroic acid [M] to L-gluroic acid [G] constituting the alginic acid (D-mannuroic acid/L-gluroic acid) [hereinafter occasionally referred to as "M/G ratio"], the inventors evaluated the mechanism using alginates having various M/G ratios. As a result, it was found that there is an M/G ratio range where color bleeding and feathering (bleeding of a monochromatic ink along paper fibers) can be further inhibited.

In other words, when the ink composition of the present invention comprises as the foregoing alginate (B) an alginate having an M/G ratio of preferably from 0.8 to 1.5, more preferably from 1.0 to 1.5, it can be prevented from penetrating into the paper and can flow on the paper to a reduced extent, making it possible to simultaneously solve the two opposing problems, i.e., eliminating feathering and color bleeding while improving the coloring properties.

The M/G ratio of alginate can be determined by acid hydrolysis. The alginate having a specific M/G ratio can be selected by the kind of seaweeds to be extracted. According to "Application of Alginic acid", *New Food Industry*, Vol. 28, No. 4, 1986, for example, the M/G ratio of an alginate derived from ash of wakame seaweed is 1.23.

As mentioned above, the ink composition of the present invention comprises an alginate (B) and thus can be used as it is with an ordinary paper carrying polyvalent metal ions on the surface thereof. However, if the ink composition of the present invention is printed on a recording medium containing no polyvalent metal ions on the surface thereof (particularly recording paper), a polyvalent (particularly divalent or trivalent) metal ion other thin magnesium (e.g., calcium, aluminum) is preferably fixed on the surface thereof before printing. The fixing of a polyvalent metal ion can be accomplished by impregnating the recording medium with or dipping the recording medium in an aqueous solution (preferably saturated aqueous solution) of polyvalent metal ion such as aqueous solution of calcium nitrate and aluminum sulfate or spraying the aqueous solution onto the recording medium, and then drying the recording medium.

The alginate (B) incorporated in the ink composition of the present invention exerts the foregoing excellent effects. On the other hand, however, it was found that if the water content is evaporated from the ink composition in the vicinity of the nozzle of the recording head, the ink composition suddenly thickens due to the alginate. Further, the ink composition solidifies. This causes malinjection of the ink composition from the nozzle or clogging of the nozzle. The ink composition of the present invention can eliminate this defect by the addition of the liquid wetting agent (C).

The liquid wetting agent (C) is a liquid wetting agent at an ordinary temperature. In particular, a high boiling and lowly volatile water-soluble organic solvent. (e.g., water-soluble organic solvent having a boiling point of not less than 200° C.) may be used. Examples of the water-soluble organic solvent include a polyhydric alcohol such as $C_{2-10}$ dihydric to pentahydric alcohol, nitrogen-containing hydrocarbon solvent such as formamide, imidazolidinone, pyrrolidone and amine, and sulfur-containing hydrocarbon solvent. These solvents may be used, singly or in combination.

Specific preferred examples of the water-soluble high boiling and lowly volatile organic solvent will be given below.
(1) Alkylene glycol compound represented by the following general formula (I):

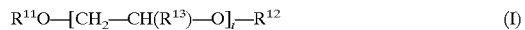

wherein $R^{11}$ and $R^{12}$ each independently represent a hydrogen atom, methyl group or ethyl group; $R^{13}$ represents a hydrogen atom or $C_{1-4}$ lower alkyl group, preferably hydrogen atom, methyl group or ethyl group; and t represents an integer of from 1 to 20, preferably from 1 to 15.

Examples of the alkylene compound include glycol compound such as ethylene glycol, diethylene glycol, triethylene glycol, propylene glycol, dipropylene glycol, 1,2-butanediol, 1,2-pentanediol, 1,2-hexanediol, polyethylen glycol and polypropylene glycol, monoether compound such, as ethylene glycol monomethyl ether, ethylene glycol monoethyl ether, diethylene glycol monomethyl ether, diethylene glycol monoethyl ether, triethylene glycol monomethyl ether, triethylene glycol monoethyl ether, and diether compound such as triethylene glycol dimethyl ether and triethylene glycol diethyl ether.
(2) Dihydric alcohol compound represented by the following general formula (II):

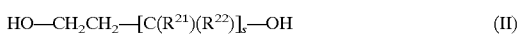

wherein $R^{21}$ and $R^{22}$ each independently represent a hydrogen atom or $C_{1-4}$ straight-chain or branched alkyl group; and s represents an integer of from 1 to 6, preferably from 1 to 4.

Examples of the dihydric alcohol compound include 1,3-propanediol, 1,4-butanediol, 1,3-butanediol, 1,5-pentanediol, 1,4-pentanediol, 1,3-pentanediol, 1,6-hexanediol, 1,5-hexanediol, 1,4-hexanediol, and 1,3-hexanediol.
(3) Trihydric alcohol compound represented by the following general formula (III):

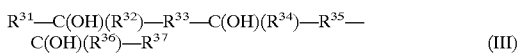

wherein $R^{31}$, $R^{32}$, $R^{34}$, $R^{36}$, and $R^{37}$ each independently represent a hydrogen atom or $C_{1-4}$ lower alkyl group, preferably hydrogen atom, methyl group or ethyl group; and $R^{33}$ and $R^{35}$ each represent a carbon-carbon direct bond or $C_{1-4}$ alkylene group.

Examples of the trihydric alcohol compound include glycerin, and 1,2,6-hexanetriol. (4) Ethanolamine compound represented by the following general formula (IV):

wherein $R^{41}$ represents a hydrogen atom or $C_{1-4}$ lower alkyl group, preferably hydrogen atom, methyl group or ethyl group; $R^{42}$ represents a hydrogen atom, $C_{1-4}$ lower alkyl group or —[$CH_2CH(R^{41})OH$] group; u represents an integer of from 1 to 3; and v represents 0 or an integer of from 1 to 2, with the proviso that the sum of u and v is 3.

Examples of the ethanolamine compound include monoethanolamine, N,N-dimethylethanolamine, N,N-diethylethanolamine, diethanolamine, triethanolamine, triisopropanolamine, and N-n-butyldiethanolamine.
(5) Other preferred examples of the water-soluble high boiling and lowly volatile organic solvent include 2- or 3-pyrrolidone compound which is optionally N-substituted by methyl group or ethyl group such as 2-pyrrolidone and N methyl-2-pyrrolidone, imidazolidinone compound which is optionally N,N'-di-substituted by methyl group such as 1,3-dimethyl-2-imidazolidione, formamide which is optionally N,N-di-substituted by methyl group such as formamide and dimethylformamide, $C_{2-4}$ thioglycol compound such as thioglycol and thiodiglycol, and dimethyl sulfoxide.

The inventors found that if the liquid wetting agent component (C) comprises at least glycerin in an amount of not less than 8% by weight based on the total weight of the ink composition of the present invention, complex color bleeding particularly on the recording medium can be lessened or eliminated. Further, a highly colored image can be printed particularly on an ordinary paper while satisfying these requirements. Thus, a sharp and clear image can be obtained. Moreover, an ink composition for ink jet recording causing no clogging in the head nozzle can be obtained. The upper limit of the glycerin content is not specifically limited but preferably is not more than 20% by weight from the standpoint of inhibition of malinjection due to thickening.

The content of the liquid wetting agent (C) components other than the foregoing glycerin depends on the kind of the liquid wetting agent used and the glycerin content and thus is not specifically limited but preferably is not more than 22% by weight, more preferably from 3 to 15% by weight based on the total weight of the ink composition. Accordingly, the content of the liquid wetting agent (C) including the foregoing glycerin depends on the kind of the liquid wetting agent and the glycerin content and thus is not specifically limited but preferably is from 8 to 30% by weight, more preferably from 15 to 25% by weight. If the content of the wetting agent (C) including the foregoing glycerin falls below 8% by weight, it can cause nozzle clogging. On the other hand, if the content of the wetting agent (C) including the foregoing glycerin exceeds 30% by weight, the resulting thickening can cause malinjection.

Further, the ink composition of the present invention preferably comprises the foregoing alginate (B) and glycerin in a weight ratio of 1:50 to 1:20 to provide a better recovery from clogging. If the foregoing weight ratio falls below 1:50, a sufficient effect of providing a good recovery from clogging cannot be exerted. On the contrary, if the foregoing weight ratio exceeds 1:200, the ink viscosity can become too high for practical use.

An ink composition for ink jet recording has heretofore normally comprised a surface active agent in a concentration of not less than critical micelle concentration (cmc) to attain an enhanced penetrating power that lessens color bleeding. However, in the present invention, it is not necessary that the penetrating power be extremely raised as the conventional ink composition. The ink composition of the present invention comprises as the foregoing penetrant (D) one or more penetrants selected from the group consisting of [I] a surface active agent having a concentration of not more than critical micelle concentration (cmc) in the composition [II] a monohydric alcohol in an amount of from 1 to 10% by weight based on the weight of the ink composition, and [III] a polyhydric alcohol derivative in an amount of from 0.5 to 5% by weight based on the ink composition to provide thorough elimination of color bleeding.

As the foregoing surface active agent there may be used any one of anionic, cationic, amphoteric and nonionic surface active agents.

Examples of the anionic surface active agent include alkylsulfocarboxylate, a-olefinsulfonate, polyoxyethylene alkyl ether acetate, N-acylamino acid and salt thereof, N-acylmethyltaurate, alkyl sulfate polyoxyalkyl ether sulfate, alkyl sulfate polyoxyethylene alkyl ether phosphate, rosin soap, castor oil sulfuric acid ester salt, lauryl alcohol sulfuric acid ester salt, alkylphenol type phosphoric acid ester, alkyl type phosphoric acid ester, alkylaryl sulfonate, diethyl sulfosuccinate, diethylhexyl sulfosuccinate, diocylsulfosuccinate, 2-vinylpyridine derivative, and poly-4-vinylpyridine derivative.

Examples of the amphoteric surface active agent include betaine lauryldimethylaminoacetate, 2-alkyl-N-carboxymethyl-N-hydroxyethylimidazolinium betaine, palm oil aliphatic acid amide propyldimethylaminoacetic acid betaine, polyoctylpolyaminoethylglycine, and imidazoline derivative.

Examples of the nonionic surface active agent including ether such as polyoxyethylene nonyl phenyl ether, polyoxyethylene dodecyl phenyl ether, polyoxyethylene alkyl aryl ether, polyoxyethylene oleyl ether, polyoxyethylene lauryl ether, polyoxyethylene alkyl ether and polyoxyalkylene alkyl ether, ester such as polyoxyethylene oleic acid ester, polyoxyethylene oleic acid ester, polyoxyethylene distearic acid ester, sorbitan laurate, sorbitan monostearate, sorbitar monooleate, sorbitan sesquioleate, polyoxyethylene monooleate and polyoxyethylene stearate, and acetylene glycol surface active agent represented by the following general formula:

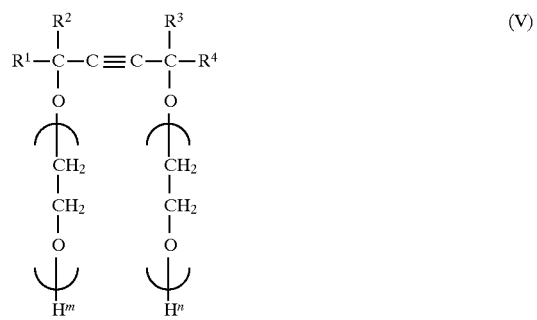

wherein $R^1$, $R^2$, $R^3$ and $R^4$ each independently represent a $C_{1-6}$ alkyl group; and n and m each represent an integer, with the proviso that the sum of n and m is from 0 to 30, such as 2,4,7,9-tetramethyl-5-decyne-4,7-diol, 3,6-dimethyl-4-octyne-3,6-diol and 3,5-dimethyl-1-hexyne-3-ol (e.g., Surfynol 104, 82, 465, 485, TG, available from Nisshin Kagaku K.K.). Among these surface active agents, a nonionic surface active agent which can well foaming or provide a good reliability in jetting from nozzle is preferred. In particular, an ethylene oxide- or propylene oxide-added surface active agent or acetylene glycol may be better used.

As the monohydric alcohol there may be used a $C_{1-4}$ monohydric alcohol such as methanol, ethanol, n-propanol, i-propanol and n-butanol. If the content of the monohydric alcohol is from 1 to 10% by weight based on the weight of the ink composition, a desirable penetrating capacity can be obtained.

As the polyhydric alcohol derivative there may be used a complete or partial etherification product of a $C_{2-6}$ dihydric to pentahydric alcohol with a $C_{1-4}$ lower alcohol. The term "polyhydric alcohol derivative" as used herein is meant to indicate an alcohol derivative at least one hydroxy group of which is etherified but doesn't mean a polyhydric alcohol free of etherified hydroxyl group itself. The polyhydric alcohol lower alkyl ether as a preferred ether is a compound represented by the following general formula (VI):

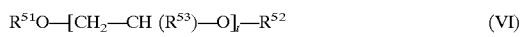

wherein $R^{51}$ and $R^{52}$ each independently represent a hydrogen atom or $C_{3-6}$ alkyl group (preferably butyl group); $R^{53}$ represents a hydrogen atom or $C_{1-4}$ lower alkyl group, preferably hydrogen atom, methyl group or ethyl group; and t represents an integer of from 1 to 8, preferably from 1 to 4, with the proviso that at least one of $R^{51}$ and $R^{52}$ is a $C_{3-6}$ alkyl group (preferably butyl group).

Examples of the polyhydric alcohol lower alkyl ether include mono, di or triethylene glycol-mono or di-$C_{3-6}$-alkyl ether, and mono, di or tripropylene glycol-mono or di-$C_{3-6}$-alkyl ether. Preferred among these polyhydric alcohol lower alkyl ethers are triethylene glycol monobutyl ether, diethylene glycol monobutyl ether, diethylene glycol monoethyl ether, diethylene glycol monomethyl ether, and propylene glycol monobutyl ether. Most preferred among these polyhydric alcohol lower alkyl ethers is triethylene glycol monobutyl ether.

If the content of the polyhydric alcohol derivative is from 0.5 to 5% by weight based on the weight of the ink composition, a desirable penetrating capacity can be obtained.

In order to provide the ink composition of the present invention with a necessary penetrating capacity, the foregoing surface active agent [I], monohydric alcohol [II] and polyhydric alcohol derivative [III] may be used, singly or in combination, in the respective concentration. A particularly preferred combination is a combination of a nonionic surface active agent, as the foregoing surface active agent [I], preferably acetylene glycol, e.g., Surfynol, and triethylene glycol, as the foregoing polyhydric alcohol derivative [III], e.g., triethylene glycol monobutyl ether.

The ink composition of the present invention may comprise a solid wetting agent (F) which is solid (particularly particulate or crystalline) at an ordinary temperature in combination with the alginate (B) to exert a synergistic effect in coloring properties. In other words, the high coloring properties obtained by the incorporation o the alginate (B) can be further enhanced by the combined use of the solid wetting agent (F). The mechanism of this effect is unknown. It is thought that the solid wetting agent (F) is left on the recording medium (e.g., ordinary printing paper) to prevent the colorant (A) from penetrating into the recording medium. However, the mechanism of this effect is not limited to the foregoing inference.

As the solid wetting agent (F) there may be used a highly hygroscopic compound which can be easily dissolved in an aqueous ink composition or water and can provide the ink composition with wetting properties. Examples of such a compound include urea, cyclodextrin such as hydroxypropyl-β-cyclodextrin, trimethylol-substituted $C_{2-4}$ lower alkane compound such as trimethylolethane and trimethylolpropane, 5-to 7-membered lactam compound such as caprolactam, and monosaccharide or polysaccharide such as sucrose and fructose. The content of the solid wetting agent (F) depend on the kind and content of the foregoing liquid wetting agent (C) and thus is not specifically limited but preferably is not more than 20% by weight, more preferably from 0.5 to 10% by weight based on the total weight of the ink composition. If the content of the solid wetting agent (F) falls below 0.5% by weight, a sufficient effect of providing high coloring properties cannot be exerted. On the contrary, if the content of the solid wetting agent (F) exceeds 20% by weight, the resulting thickening can cause malinjection. Further, the content of the solid wetting agent (F) is preferably not more than 30% by weight, more preferably from 15 to 25% by weight based on the weight of the ink composition as calculated in terms of the sum of the solid wetting agent (F) and the liquid wetting agent (C) including glycerin. If the sum of the solid wetting agent (F) and the liquid wetting agent (C) including glycerin exceeds 30% by weight, it can cause malinjection.

The ink composition of the present invention may further comprise a surface diffusibility imparting agent (G).

The term "surface diffusibility imparting agent" as used herein is meant to indicate a compound having a diffusibility (T) of from 1.1 to 5 in the following diffusibility test. The diffusibility can be determined by the following procedure. In some detail, the specimen compound is dissolved in water to prepare a 0.05 wt-% aqueous solution. 1 microliter of the aqueous solution thus prepared is then dropped onto a paper having a stöckigt sizing degree of not less than 4 seconds [The stöckigt sizing degree is determined by dropping a droplet of a 1% aqueous solution of ferric iron chloride onto a piece of paper floating on a 2% aqueous solution of ammonium thiocyanate, and then determining the time required until three red dots appear as a sizing degree (JIS P 8122)]. After 2 minutes, the diameter of droplet on the paper (Ds) is measured. Subsequently, 1 microliter of an ion-exchanged water is dropped onto a paper under the same conditions as above. After 2 minutes, the diameter of droplet on the paper (Dw) is measured. The diameter of droplet is not that of droplet 102 which has penetrated into the fiber of paper 101 but is that of droplet 103 which has spread over the surface of the paper 101 as shown in FIG. 1. The diffusibility (T) can be obtained by the following calculation:

$T=Ds/Dw$

The surface diffusibility imparting agent (G) which can be incorporated in the ink composition of the present invention can be easily selected by carrying out the foregoing diffusibility test. Specific examples of the compound containing —SiO—group in its molecule (silicon compound) include a compound represented by the following general formula (VII):

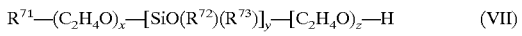

$R^{71}-(C_2H_4O)_x-[SiO(R^{72})(R^{73})]_y-[C_2H_4O]_z-H$ (VII)

wherein $R^{71}$ represents a $C_{5-20}$ straight-chain or branched. aliphatic hydrocarbon group such as straight-chain or branched alkyl, alkenyl or alkinyl group; $R^{72}$ and $R^{73}$ each independently represent a hydrogen atom or $C_{1-5}$ straight-chain or branched aliphatic hydrocarbon group such as straight-chain or branched alkyl, alkenyl or alkinyl group;.x represents 0 or an integer of from 1 to 10; y represents an integer of from 2 to 10; and z represents 0 or an integer of from 1 to 10, with the proviso that the sum of x and z is no less than 3.

Specific examples of the compound containing fluorine (fluorine compound) include a compound represented by the following general formula (VIII):

$R^{81}-(CH_2)_p-O-(C_2H_4O)_q-H$ (VIII)

wherein $R^{81}$ represents a $C_{1-10}$ aliphatic hydrocarbon group substituted by at least one fluorine atom such as straight-chain or branched alkyl, alkenyl or alkinyl group; p represents 0 or an integer of from 1 to 10; and q represents an integer of from 1 to 10.

As the silicone compound or fluorine compound there may be used a commercial compound. As the silicon compound there may be used Sansilicone M-84 (available from Sanyo Chemical Industries, Ltd.). As the fluorine compound there may be used Ftergent 251, 100 and 150 (available from Neos Co., Ltd.). These fluorine or silicone compounds may be used, singly or in combination.

The ink composition of the present invention may comprise the foregoing surface diffusibility imparting agent such as fluorine compound and/or silicone compound incorporated therein in an amount of preferably not more than 5% by weight, more preferably from 0.01 to 3% by weight based on the total weight of the ink composition. If the content of the surface diffusibility imparting agent falls below 0.01% by weight, the desired effect cannot be fully exerted. On the contrary, if the content of the surface diffusibility imparting agent exceeds 5% by weight, it can cause malinjection. The ink composition of the present invention comprising the foregoing surface diffusibility imparting agent incorporated therein can spread over the surface of a paper to a small thickness without penetrating deep into the paper. Further, the ink composition of the present invention comprises an alginate. Accordingly, the ink composition of the present invention can uniformly extend over the surface of the paper to provide the image with a sharper edge and exert an enhanced effect of inhibiting color bleeding.

A preferred embodiment of the ink composition of the present invention comprises (A) a colorant in an amount of from 0.2 to 10% by weight, preferably from 0.5 to 7% by weight; (B) an alginate in an amount of from 0.02 to 0.5% by weight, preferably from 0.05 to 0.2% by weight; (C) a liquid wetting agent (containing glycerin) in an amount of not less than 8% by weight, preferably from 8 to 20% by weight; (D) [I] a surface active agent having a concentration of not more than critical micelle concentration, [II] a monohydric alcohol in an amount of from 1 to 10% by weight and/or [III] a polyhydric alcohol derivative in an amount of from 0.5 to 5% by weight as a penetrant; optionally (F) a solid wetting agent in an amount of not more than 20% by weight, preferably from 0.5 to 10% by weight; optionally (G) a surface diffusibility imparting agent in an amount of not more than 5% by weight, preferably from 0.01 to 3% by weight; and (E) the balance of water.

The ink composition for ink jet recording of the present invention may further comprise various known additives such as water-soluble organic solvent other than foregoing liquid wetting agent (C), various dispersants, viscosity modifiers, and/or fluorescent brightening agents besides the foregoing various components as necessary. Examples of the viscosity modifier include water-soluble natural or synthetic high molecular compounds such as cellulose, polyvinyl pyrrolidone, polyvinyl alcohol and water-soluble resin. The ink composition for ink jet recording of the present invention may further comprise a buffering solution, mildew-proofing agent or the like incorporated therein as a pH adjustor.

The ink composition of the present invention may comprise a specific resistance adjustor such as inorganic salt (e.g., halide of alkaline metal, halogenated ammonium such as lithium chloride, ammonium chloride, sodium chloride) incorporated therein to prepare a recording liquid adapted for ink jet recording process comprising charging of recording liquid.

The mixing ratio of the foregoing components can be properly adjusted to control the thermal physical properties (e.g., heat of vaporization, boiling point, melting point, specific heat, thermal expansion coefficient, and/or thermal conductivity), producing an ink composition adapted for ink jet recording process which comprises jetting a recording liquid by the action of heat energy.

The viscosity of the ink composition of the present invention can be adjusted to preferably not more than 50 mPa.s, more preferably not more than 20 mPa.s to secure stable ink injection from the head and stable ink supply to the head.

The preparation of the ink composition for ink jet recording of the present invention can be accomplished by properly mixing the foregoing various components in an arbitrary order to make a solution (or dispersion), and then removing impurities or the like from the solution or dispersion by filtration. Further, colorants are properly selected. Moreover, other compounding ingredients can be properly selected in combination with the colorants thus selected. Thus, a yellow ink composition, magenta ink composition, cyan ink composition, black ink composition, blue ink composition, green ink composition or red ink composition according to the present invention can be prepared.

The foregoing ink composition of the present invention can be charged in a common ink cartridge which is then mounted in a common ink jet recording apparatus to effect an ink jet recording process. Further, at least one of the foregoing yellow ink composition, magenta ink composition, cyan ink composition, black ink composition, blue ink composition, green ink composition, and red ink composition (preferably all of the foregoing various ink compositions) can be used as an ink composition. In other words, the foregoing ink cartridge in which the magenta ink composition has been charged may be mounted in the recording apparatus in combination with an ink cartridge in which the yellow ink composition has been charged, an ink cartridge in which the cyan ink composition has been charged, and optionally an ink cartridge in which the black ink composition has been charged. Alternatively, an ink cartridge in which the magenta ink composition, the yellow ink composition, the cyan ink composition, and optionally the black ink composition have been separately charged in partitioned compartments may be mounted in a color ink jet recording apparatus to effect a color ink jet recording process.

The ink jet recording process of the present invention is not specifically limited so far as one or more of the foregoing ink compositions of the present invention are used. However, two or more of the foregoing color ink compositions of the present invention are preferably used in a color ink jet recording process using at least two color ink compositions. In other words, the color ink jet recording process is preferably carried out by using an ink set comprising the foregoing yellow ink composition, magenta ink composition and cyan ink composition, and optionally the foregoing black ink composition in combination to form a red image, a green image and a blue image on which three other ink compositions are overlapped. Alternatively, a separate black ink composition may be used to form a black image. Further, in addition to the foregoing various color ink compositions, a blue ink composition, a green ink composition, and/or a red ink composition may be used to for various images in the color ink jet recording process of the present invention.

EXAMPLES

The present invention will be further described in the following examples, but the present invention should not be construed as being limited thereto. As sodium alginate there was used Manucol DMF (M/G ratio: 1.3) or Manugel DMD (M/G ratio: 0.7) available from Dainippon Pharmaceutical Co. Ltd. in the following examples. The viscosity [viscosity of 10 g/l aqueous solution (20° C.)] of these products was 45±5 mPa. In the following examples, the following compounding ingredients were mixed and stirred at a temperature of 60° C. for 2 hours. The mixture was then filtered through a membrane filter having a pore diameter of 0.8 $\mu$m under a pressure of 2 kg/cm$^2$ to obtain an ink composition.

EXAMPLE 1

Four kinds (color) of ink compositions of the present invention having the following formulation were prepared.

| Compounding ingredient | Added amount (wt %) |
|---|---|
| Colorant | As defined below |
| Sodium alginate (Manucol DMF) | 0.1 |
| Glycerin | 10.0 |
| Diethylene glycol | 5.0 |
| Triethylene glycol monobutyl ether | 4.0 |
| Pure water | To make 100 wt % |

As a colorant there was used direct black 166 (2.2% by weight) to prepare a black ink composition. As a colorant there was used direct yellow 86 (3.3% by weight) to prepare a yellow ink composition. As a colorant there was used direct red 227 (1.8% by weight) to prepare a magenta ink composition. As a colorant there was used direct blue 199 (2.0% by weight) to prepare a cyan ink composition.

EXAMPLE 2

Four kinds (color) of ink compositions of the present invention having the following formulation were prepared.

| Compounding ingredient | Added amount (wt %) |
|---|---|
| Colorant | As defined below |
| Sodium alginate (Manugel GMD) | 0.1 |
| Glycerin | 10.0 |
| Diethylene glycol | 5.0 |
| Triethylene glycol monobutyl ether | 4.0 |
| Pure water | To make 100 wt % |

As a colorant there was used direct black 166 (2.0% by weight) to prepare a black ink composition. As a colorant there was used direct yellow 86 (1.8% by weight) to prepare yellow ink composition. As a colorant there was used acid red 52 (2.2% by weight) to prepare a magenta ink composition As a colorant there was used direct blue 199 (1.4% by weight to prepare a cyan ink composition.

EXAMPLE 3

Four kinds (color) of ink compositions of the present invention having the following formulation were prepared.

| Compounding ingredient | Added amount (wt %) |
|---|---|
| Colorant | As defined below |
| Sodium alginate (Manucol DMF) | 0.15 |
| Glycerin | 14.0 |
| Diethylene glycol | 4.0 |
| Triethylene glycol monobutyl ether | 4.0 |
| Pure water | To make 100 wt % |

As a colorant there was used a dye represented by the following general formula:

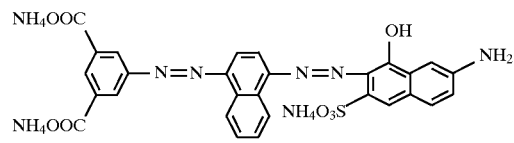

(3.3% by weight) to prepare a black ink composition. As a colorant there was used a dye represented by the following general formula:

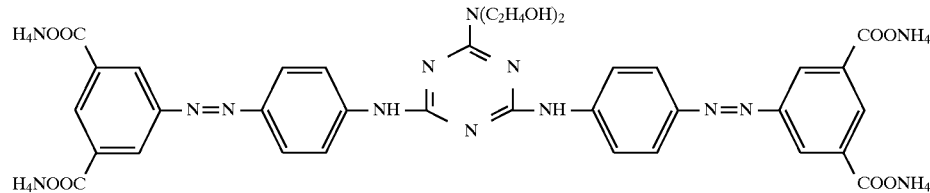

(2.2% by weight) to prepare a yellow ink composition. As a colorant there was used a dye represented by the following general formula:

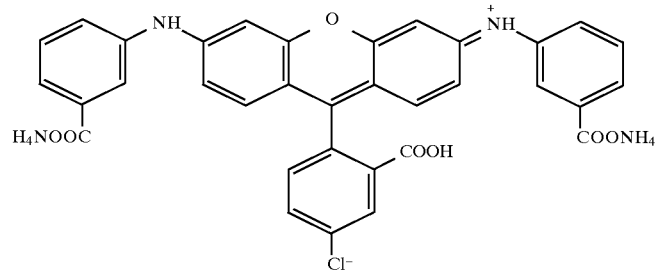

(2.2% by weight) to prepare a magenta ink composition. As a colorant there was used a dye represented by the following general formula:

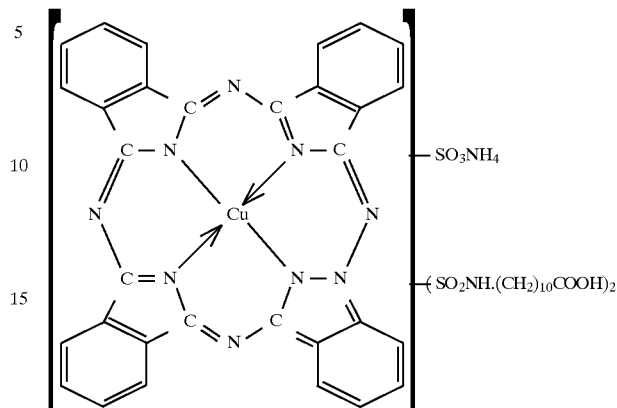

(2.7% by weight) to prepare a cyan ink composition.

EXAMPLE 4

Four kinds (color) of ink compositions of the present invention having the following formulation were prepared.

| Compounding ingredient | Added amount (wt %) |
|---|---|
| Colorant | As defined below |
| Sodium alginate (Manucol DMF) | 0.08 |
| Glycerin | 12.0 |
| Urea | 4.0 |
| Surfynol 465 | 0.6 |
| Triethylene glycol monobutyl ether | 2.0 |
| Pure water | To make 100 wt % |

As a colorant there was used direct black 166 (2.5% by weight) to prepare a black ink composition. As a colorant there was used acid yellow 23 (2.1% by weight) to prepare a yellow ink composition. As a colorant there was used acid red 52 (1.8% by weight) to prepare a magenta ink composition. As a colorant there was used acid blue 9 (1.2% by weight) to prepare a cyan ink composition.

EXAMPLE 5

Four kinds (color) of ink compositions of the present invention having the following formulation were prepared.

| Compounding ingredient | Added amount (wt %) |
|---|---|
| Colorant | As defined below |
| Sodium alginate (Manucol DMG) | 0.2 |
| Glycerin | 14.0 |
| Diethylene glycol | 4.5 |
| Urea | 3.0 |
| Triethylene glycol monobutyl ether | 3.0 |
| Ftergent 251 | 0.1 |
| Pure water | To make 100 wt % |

As a colorant there was used acid black 172 (2.5% by weight) to prepare a black ink composition. As a colorant there was used direct yellow 86 (2.2% by weight) to prepare a yellow ink composition. As a colorant there was used direct red 227 (1.9% by weight) to prepare a magenta ink composition. As a colorant there was used direct blue 199 (3.9% by weight) to prepare a cyan ink composition.

EXAMPLE 6

Four kinds (color) of ink compositions of the present invention having the following formulation were prepared.

| Compounding ingredient | Added amount (wt %) |
|---|---|
| Colorant | As defined below |
| Sodium alginate (Manugel GMD) | 0.1 |
| Glycerin | 8.0 |
| Diethylene glycol | 7.0 |
| Urea | 2.0 |
| SurfYnol 465 | 0.5 |
| Triethylene glycol monobutyl ether | 1.0 |
| Pure water | To make 100 wt % |

As a colorant there was used acid black 172 (1.6% by weight) to prepare a black ink composition. As a colorant there was used direct yellow 86 (1.8% by weight) to prepare a yellow ink composition. As a colorant there was used acid red 52 (3.0% by weight) to prepare a magenta ink composition. As a colorant there was used acid blue 9 (2.3% by weight) to prepare a cyan ink composition.

EXAMPLE 7

Four kinds (color) of ink compositions of the present invention having the following formulation were prepared.

| Compounding ingredient | Added amount (wt %) |
|---|---|
| Colorant | As defined below |
| Sodium alginate (Manugel GND) | 0.07 |
| Glycerin | 15.0 |
| SurfYnol 465 | 0.8 |
| Ftergent 251 | 0.1 |
| Pure water | To make 100 wt % |

As a colorant there was used acid black 172 (3.2% by weight) to prepare a black ink composition. As a colorant there was used acid yellow 23 (1.7% by weight) to prepare a yellow ink composition. As a colorant there was used direct red 227 (2.3% by weight) to prepare a magenta ink composition. As a colorant there was used acid blue 9 (2.0% by weight) to prepare a cyan ink composition.

<Reference Example: test for evaluation of ink properties>

The various ink compositions prepared in the foregoing Examples 1 to 7 were evaluated for various properties. The ink compositions prepared in Example 1 comprised basic compounding ingredients of the present invention. The ink compositions prepared in Example 2 comprised sodium alginate having a relatively low M/G ratio. The ink compositions prepared in Example 3 comprised a carboxyl group-containing dye alone as a colorant. The ink compositions prepared in Example 4 comprised a solid wetting agent. The ink compositions prepared in Example 5 comprised a solid wetting agent and a surface diffusibility imparting agent. The ink compositions prepared in Example 6 comprised sodium alginate having a relatively low M/G ratio, a solid wetting agent and a surface active agent. The ink compositions prepared in Example 7 comprised sodium alginate having a relatively low M/G ratio, a surface active agent and a surface diffusibility imparting agent.

The ink jet recording was conducted using a nozzle ink jet evaluating machine made on an experimental basis (Type 48; jetting nozzle diameter:30 µm; piezoelectric element driving voltage: 25 V; driving frequency: 5.5 KHz; resolution: 360 dot/in.; ink output: 0.05 µg/dot). For the evaluation of print quality, four kinds of papers. i.e., PPC paper (PPC paper (trade name) available from Xerox Co., Ltd.; RICOPY 6200 (trade name) available from Ricoh Co., Ltd.), regenerated paper (Yamayuri (trade name) available from Honshu Paper Co., Ltd.), bond paper (25% cotton paper; Gilbert Bond (trade name) available from Meed Co., Ltd.), and quality paper (OK quality paper L (trade name) available from Oji Paper Co., Ltd. were used. The term "print" as used herein is meant to indicate "print of alphabet". The term "solid print" as used herein is meant to indicate a solidly printed line.

(1) Feathering of single letter

The various ink compositions prepared in the foregoing Examples 1 to 7 were used to effect character printing. The print quality was evaluated in accordance with the following criteria. The results are set forth in Table 1.

A: Little or no difference in print quality between papers observed, no feathering and whiskers observed B: Some difference in print quality between papers observed, no offensive feathering and whiskers observed C: Definite difference in print quality between papers observed, feathering and whiskers observed depending on papers D: Definite difference in print quality between papers observed, feathering and whiskers observed on all papers (2) Effect of inhibiting color bleeding The periphery of letters printed with the black ink compositions prepared in the foregoing Examples 1 to 7 were solidly printed with the yellow, magenta and cyan ink compositions prepared in the foregoing Examples 1 to 7. The degree of bleeding of the black letter to the various colors was then evaluated by the following four-step criteria. The results are set forth in Table 1.

A: Little or no difference in print quality between papers observed, no bleeding and whiskers observed BO: Some difference in print quality between papers observed, no offensive bleeding and whiskers observed C: Definite difference in print quality between papers observed, bleeding and whiskers observed depending on papers D: Definite difference in print quality between papers observed, bleeding and whiskers observed on all papers The yellow, magenta and cyan ink compositions and the black ink composition prepared in the various examples gave the same results in all the examples. Thus, one result is shown every example in Table 1.

(3) Recovery from head clogging

The various ink compositions prepared in the foregoing Examples 1 to 7 were each mounted in a printer. Printing was then conducted. After it was confirmed that the ink composition had been jetted from all the nozzles, the head was removed from the printer to suspend the supply of the ink. The head was then allowed to stand at a temperature of 40° C. and a relative humidity of 20% for 7 days with its entire surface uncapped.

The head was then mounted again in the printer. The ink was then supplied into the head. The time of cleaning operation required until all the nozzles can jet tire ink was then evaluated by the following four-step criteria. The results are set forth in Table 1.

a: Recovered until 3 times of cleaning operation
A: Recovered until 5 times of cleaning operation
B: Recovered until 6 times of cleaning operation
C: Not recovered even by 7 times of cleaning operation The yellow, magenta and cyan ink compositions and the black ink composition prepared in the various examples gave the same results in all the examples. Thus, one result is shown every example in Table 1.

(4) Effect of enhancing print density

The ink compositions prepared in Examples 1 to 7 were each used to effect printing. The printed area was then measured for OD (optical density) by means of a Type TR927 Macbeth spectral densitometer. For the cyan-printed area, a red filter was used. For the magenta-printed area, a green filter was used. For the yellow-printed area, a blue filter was used.

The procedure of the foregoing Examples 1 to 7 were followed to prepare four kinds of ink compositions as comparative ink compositions except that sodium alginate was not used.

Using these comparative ink compositions, OD value was measured under the same conditions as mentioned above. The measurements were compared with OD values obtained with the various ink compositions of the present invention, respectively. The percent change was then evaluated by the following three-step criteria. The results are set forth in Table 1.

A: OD value increases by not less than 5%
B: OD value increases by less than 5%
C: OD value decreases by not less than 5%

The yellow, magenta, cyan and black ink compositions and the comparative composition prepared in the examples gave the same results in all the examples. Thus, one result is shown for every example in Table 1.

(5) Evaluation of water resistance

Character printing and solid printing were made on a printing paper. The printed matter was then allowed to stand at room temperature for 24 hours. 0.5 ml of water was dropped onto the printed area. The printed matter was then spontaneously dried. The printed matter thus dried was then visually judged for bleeding.

A: No remarkable bleeding observed
B: Some bleeding observed
C: Printed characters show some bleeding, solidly
D printed area shows bleeding extending beyond border
X: Printed characters cannot be read, solidly printed area loses color (6) Uniformity in solidly printed area Yellow, magenta, cyan, red, green and blue inks were each solidly printed on a paper with the ink compositions prepared in Examples 1 to 7. The printed matter was then visually evaluated for color unevenness by the following three-step criteria. The results are set forth in Table 1.

A: Little or no color unevenness observed on solidly printed area
B: Some color unevenness observed on solidly printed area, but practically acceptable
C: Color unevenness observed on solidly printed area, practically unacceptable The yellow, magenta, and cyan ink compositions prepared in the various examples and the combination thereof gave the same results in all the examples. Thus, one result is shown for every example in Table 1.

TABLE 1

| Properties to be evaluated | Example 1 | Example 2 | Example 3 | Example 4 | Example 5 | Example 6 | Example 7 |
| --- | --- | --- | --- | --- | --- | --- | --- |
| Bleeding of single letter | — | — | — | — | A | — | A |
| Effect of inhibiting color bleeding | A | B | A | A | A | B | B |
| Recovery from clogging | A | B | A | A | A | B | A |
| Effect of enhancing print density | A | B | A | A | A | B | B |
| Water resistance | — | — | A | — | — | — | — |
| Uniformity in solidly printed area | — | — | A | A | A | A | A |

The present invention can provide an ink for ink jet recording which can be stably jetted from the head nozzle without causing color bleeding upon color mixing, monochromatic bleeding and clogging in the vicinity of the head nozzle to give a highly colored high quality recorded image in color ink jet printing.

While the invention has been described in detail and with reference to specific embodiments thereof, it will be apparent to one skilled in the art that various changes and modifications can be made therein without departing from the spirit and scope thereof.

What is claimed is:

1. An ink composition for ink jet recording comprising (A) a colorant, (B) an alginate, (C) a liquid wetting agent, (D) a penetrant, and (E) water, wherein glycerin is present in said liquid wetting agent (C) in an amount of 8% by weight based on the weight of the ink composition.

2. The ink composition according to claim 1, wherein the weight ratio of said alginate (B) to glycerin is from 1: 50 to 1:200.

3. The ink composition according to claim 1, wherein said penetrant (D) comprises a single or a plurality of penetrants selected from the group consisting of (I) a surface active agent having a concentration of not more than critical micelle concentration in said composition, (II) a monohydric alcohol in an amount of from 1 to 10% by weight based on the weight of said composition, and (III) a polyhydric alcohol derivative in an amount of from 0.5 to 5% by weight based on said composition.

4. The ink composition according to claim 2, wherein as said penetrant (D) comprises a single or a plurality of penetrants selected from the group consisting of (I) a surface active agent having a concentration of not more than critical micelle concentration in said composition, (II) a monohydric alcohol in an amount of from 1 to 10% by weight based on the weight of said composition, and (III) a polyhydric alcohol derivative in an amount of from 0.5 to 5% by weight based on said composition.

5. The ink composition according to claim 3, comprising an acetylene glycol surface active agent as said surface active agent (I) and triethylene glycol monobutyl ether as said polyhydric alcohol derivative (III) in combination.

6. The ink composition according to claim 4, comprising an acetylene glycol surface active agent as said surface active agent (I) and triethylene glycol monobutyl ether as said polyhydric alcohol derivative (III) in combination.

7. The ink composition according to claim 1, further comprising (F) a solid wetting agent.

8. The ink composition according to claim 7, wherein said solid wetting agent (F) is present in an amount of from 0.5 to 20% by weight based on the weight of said ink composition.

9. The ink composition according to claim 1, further comprising (G) a surface diffusibility imparting agent.

10. The ink composition according to claim 9, wherein said surface diffusibility imparting agent (G) is a compound containing an —SiO— group or a fluorine atom in its molecule.

11. The ink composition according to claim 9, wherein said surface diffusibility imparting agent (G) is present in an amount of from 0.01 to 10% by weight based on the weight of said ink composition.

12. The ink composition according to claim 1, wherein said colorant (A) comprises a dye containing a carboxylic acid group or carboxylate group.

13. The ink composition according to claim 1, wherein said alginate (B) comprises one comprising D-mannuroic acid and L-gluroic acid in a proportion (D-mannuroic acid/L-gluroic acid) of from 0.8 to 1.5.

14. An ink composition set for color ink jet recording comprising two or more color ink compositions, wherein at least one of said ink compositions is an ink composition comprising (A) a colorant, (B) an alginate, (C) a liquid wetting agent, (D) a penetrant, and (E) water, wherein glycerin is present in said liquid wetting agent (C) in an amount of 8% by weight or more based on the weight of the ink composition.

15. An ink cartridge, containing an ink composition comprising (A) a colorant, (B) an alginate, (C) a liquid wetting agent, (D) a penetrant, and (E) water, wherein glycerin is present in said liquid wetting agent (C) in an amount of 8% by weight or more based on the weight of the ink composition.

16. A color ink cartridge, containing various ink compositions constituting an ink composition set for color ink jet recording in separate partitioned compartments comprising two or more color ink compositions, wherein at least one of said ink compositions is an ink composition comprising (A) a colorant, (B) an alginate, (C) a liquid wetting agent, (D) a penetrant, and (E) water, wherein glycerin is present in said liquid wetting agent (C) in an amount of 8% by weight or more based on the weight of the ink composition.

17. An ink jet recording apparatus, containing an ink cartridge containing an ink composition comprising (A) a colorant, (B) an alginate, (C) a liquid wetting agent, (D) a penetrant, and (E) water, wherein glycerin is present in said liquid wetting agent (C) in an amount of 8% by weight or more based on the weight of the composition.

18. A color ink jet recording apparatus, containing a color ink cartridge containing various ink compositions constituting an ink composition set for color ink jet recording comprising two or more color ink compositions, wherein at least one of said ink compositions is an ink composition comprising (A) a colorant, (B) an alginate, (C) a liquid wetting agent, (D) a penetrant, and (E) water, wherein glycerin is present in said liquid wetting agent (C) in an amount of 8% by weight or more based on the weight of the ink composition in separate partitioned compartments.

* * * * *